(12) United States Patent
Navarro-Sorroche et al.

(10) Patent No.: US 9,756,714 B2
(45) Date of Patent: Sep. 5, 2017

(54) NANO-EMITTER ION SOURCE NEUTRON GENERATOR

(71) Applicant: Halliburton Energy Services, Inc., Houston, TX (US)

(72) Inventors: Juan Navarro-Sorroche, Plano, TX (US); Weijun Guo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/777,629

(22) PCT Filed: Dec. 31, 2013

(86) PCT No.: PCT/US2013/078456
§ 371 (c)(1),
(2) Date: Sep. 16, 2015

(87) PCT Pub. No.: WO2015/102607
PCT Pub. Date: Jul. 9, 2015

(65) Prior Publication Data
US 2016/0295678 A1     Oct. 6, 2016

(51) Int. Cl.
*H05H 3/06* (2006.01)
*G01V 5/10* (2006.01)
*G21G 4/02* (2006.01)

(52) U.S. Cl.
CPC .............. *H05H 3/06* (2013.01); *G01V 5/10* (2013.01); *G21G 4/02* (2013.01)

(58) Field of Classification Search
CPC .. H05H 3/00; H05H 3/06; G21G 4/00; G21G 4/02; G21B 3/006
See application file for complete search history.

(56) References Cited

U.S. PATENT DOCUMENTS 2,211,668 A     8/1940   Penning
3,546,512 A * 12/1970   Frentrop ................ H01J 27/02
                                                                 313/155
(Continued)

FOREIGN PATENT DOCUMENTS

WO    WO-2008070103 A2    6/2008
WO    WO-2012/105937 A1    8/2012
(Continued)

OTHER PUBLICATIONS

"European Application Serial No. 13900746.2, Extended European Search Report mailed Nov. 20, 2015", 11 pgs.
(Continued)

*Primary Examiner* — Marshall O'Connor
(74) *Attorney, Agent, or Firm* — Gilliam IP PLLC (57) ABSTRACT

A well logging tool includes a neutron generator having an ion source for ion production by electron impact ionization wherein ionization current trajectory is determined by an electric field and an at least partially misaligned magnetic field. The electric field can be provided by an electrode arrangement having a cathode associated with a field emitter array including a multitude of nanoemitters. The magnetic field can be provided by a permanent magnet incorporated in the neutron generator to act transversely to the electric field in at least part of an ion source chamber in which an ionization current emitted by the field emitter array travels through an ionizable gas. Charged particles traveling through the ionizable gas thus follow respective trajectories that are longer than would be the case in the absence of the magnetic field, thereby increasing ionization probability.

20 Claims, 5 Drawing Sheets

(56) References Cited

U.S. PATENT DOCUMENTS

| | | | |
|---|---|---|---|
| 4,570,067 | A | 2/1986 | Gadeken |
| 4,675,145 | A | 6/1987 | Kuswa et al. |
| 4,794,792 | A | 1/1989 | Flaum et al. |
| 4,924,485 | A | 5/1990 | Hoeberling |
| 4,996,017 | A | 2/1991 | Ethridge |
| 5,104,610 | A | 4/1992 | Bernardet et al. |
| 5,293,410 | A | 3/1994 | Chen et al. |
| 2001/0007783 | A1 | 7/2001 | Lee et al. |
| 2002/0096363 | A1 | 7/2002 | Evans et al. |
| 2004/0022341 | A1 | 2/2004 | Leung et al. |
| 2009/0045329 | A1 | 2/2009 | Stoller |
| 2009/0065712 | A1 | 3/2009 | Zillmer et al. |
| 2009/0108192 | A1 | 4/2009 | Groves |
| 2009/0114838 | A1 | 5/2009 | Lozano et al. |
| 2009/0135982 | A1* | 5/2009 | Groves ............ H05H 3/06 376/113 |
| 2010/0061500 | A1 | 3/2010 | Lou et al. |
| 2010/0301196 | A1 | 12/2010 | Chu et al. |
| 2011/0049345 | A1 | 3/2011 | Roberts |
| 2011/0114830 | A1 | 5/2011 | Reijonen et al. |
| 2011/0169492 | A1 | 7/2011 | Groves |
| 2012/0213319 | A1 | 8/2012 | Kwan et al. |
| 2013/0044846 | A1 | 2/2013 | Schenkel et al. |
| 2013/0105680 | A1 | 5/2013 | Guo et al. |
| 2013/0168542 | A1 | 7/2013 | Navarro-sorroche |
| 2016/0216400 | A1 | 7/2016 | Navarro-Sorroche et al. |
| 2016/0231457 | A1 | 8/2016 | Navarro-Sorroche et al. |

FOREIGN PATENT DOCUMENTS

| | | | |
|---|---|---|---|
| WO | WO-2013016145 | A1 | 1/2013 |
| WO | WO-2015/102615 | A1 | 7/2015 |
| WO | WO-2015/102617 | A1 | 7/2015 |
| WO | WO-2015102607 | A1 | 7/2015 |

OTHER PUBLICATIONS

Chen, A X, et al., "Electronic neutron sources for compensated porosity well logging", *Nuclear Instruments & Methods in Physics Research. Section A: Accelerators, Spectrometers, Detectors, and Associated Equipment*, vol. 684, (Apr. 25, 2012), 52-56.
Persaud, Arun, et al., "Development of a Compact Neutron Source based on Field Ionization Processes", Arvix.Org, Cornell University Library, 201 Olin Library Cornell University Ithaca, Ny 14853, (Oct. 12, 2010).
Sy, A, et al., "Novel methods for improvement of a Penning ion source for neutron generator applications", *Review of Scientific Instruments*, 83(2), 02B309, (2012), 3 pgs.
"International Application Serial No. PCT/US2013/078485, International Preliminary Report on Patentability mailed Apr. 11, 2016", 9 pgs.
"International Application Serial No. PCT/US2013/078485, Response filed Oct. 29, 2015 to Written Opinion mailed Sep. 22, 2014", 4 pgs.
"U.S. Appl. No. 14/914,560, Non Final Office Action mailed Aug. 3, 2016", 14 pgs.
"European Application Serial No. 13900746.2, Office Action mailed Jul. 22, 2016", 4 pgs.
"European Application Serial No. 13900746.2, Office Action mailed Dec. 8, 2015", 1 pg.
"European Application Serial No. 13900746.2, Response filed Jun. 16, 2016 to Office Action mailed Dec. 8, 2015", 15 pgs.
"European Application Serial No. 13900838.7, Office Action mailed Aug. 9, 2016", 2 pgs.
"International Application Serial No. PCT/US2013/078456, International Preliminary Report on Patentability mailed Jul. 14, 2016", 7 pgs.
"International Application Serial No. PCT/US2013/078482, International Preliminary Report on Patentability mailed Jul. 14, 2016", 12 pgs.
"International Application Serial No. PCT/US2013/078456, International Search Report mailed Sep. 25, 2014", 3 pgs.
"International Application Serial No. PCT/US2013/078456, Written Opinion mailed Sep. 25, 2014", 5 pgs.
"International Application Serial No. PCT/US2013/078482, International Search Report mailed Sep. 29, 2014", 3 pgs.
"International Application Serial No. PCT/US2013/078482, Written Opinion mailed Sep. 29, 2014", 10 pgs.
"International Application Serial No. PCT/US2013/078485, International Search Report mailed Sep. 22, 2014", 3 pgs.
"International Application Serial No. PCT/US2013/078485, Written Opinion mailed Sep. 22, 2014", 8 pgs.
Johnson, et al., "Field ion source development for neutron generators", Nuclear Instruments and Methods in Physics Research A, vol. 663, Jan. 1, 2012 00:00:00.0, 64-74.
Persaud, et al., "A compact neutron generator using a field ionization source", Proceedings of the 14th International Conferenceon Ion Sources, Giardini Naxos, Italy, Sep. 1, 2011 00:00:00.0.

* cited by examiner

*FIG. 5*

NANO-EMITTER ION SOURCE NEUTRON GENERATOR

PRIORITY APPLICATIONS

This application is a U.S. National Stage Filing under 35 U.S.C. 371 from International Application No. PCT/US2013/078456, filed on 31 Dec. 2013, and published as WO 2015/102607 A1 on 9 Jul. 2015; which application and publication are incorporated herein by reference in their entirety.

TECHNICAL FIELD

This disclosure generally relates to neutron generation for investigation of subsurface formation characteristics, and also relates to neutron generators for well logging.

BACKGROUND

Pulsed-neutron formation evaluation tools interrogate the formation surrounding the borehole with high-energy neutrons produced by a neutron generator forming part of the tool. Because of interaction by the neutrons with elements of the tool, with the borehole, and with the formation, gamma radiation is created, which is then measured by gamma radiation sensors that also form part of the tool. Measurement data captured by the gamma radiation sensors can be processed to derive information about the properties of the borehole and the subsurface formations.

Typically, the energetic neutrons are produced by a fusion reaction caused by generating an ion beam and accelerating it into collision with a target dosed with target molecules or atoms. The fusion reaction is often a deuterium-tritium reaction. Most often, the mechanism used to generate the ion beam functions fundamentally on the principles disclosed by Penning in U.S. Pat. No. 2,211,668. In such ion sources, a high voltage pulse is applied between an anode and a cathode to create an arc discharge that initiates ionization of an ionizable gas exposed to arc discharge.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth to provide a thorough understanding of example embodiments. It will be evident to one skilled in the art, however, that the present subject matter may be practiced without these specific details.

Some embodiments of the disclosure provide a well logging tool which includes a neutron generator having an ion source for ion production by electron impact ionization, wherein electron travel through an ionizable gas is determined by an electric field and at least partially misaligned magnetic field. The electric field may be provided by an electrode arrangement, with the magnet field being provided by a permanent magnet incorporated in the neutron generator.

An electron traveling through the ionizable gas thus follows a trajectory which is modified by operation of the magnetic field to be longer than would be the case in the absence of the magnetic field, in which the electron would be propelled exclusively by operation of the electric field. A resultant increase in trajectory length results in an increased ionization probability due to electron impact with particles of the ionizable gas.

Electrode arrangement may comprise an annular anode which is radially and axially spaced from an ion source cathode, with an electron emitter configured to emit electrons at or adjacent the ion source cathode. The electric field provided between the cathode and the anode in such case accelerates emitted ions at least partially radially outwards towards the annular anode. The permanent magnet may in such cases be arranged to urge the emitted electrons in an axial direction, acting transversely to the electric field and at least parts of an ion source chamber in which the ionizable gas is held.

The ion source cathode may comprise multiple nano-emitters, in one embodiment being provided by an array of nano-emitters. The array of nano-emitters may provide a field emitter array to produce an electron current routed through an ionizable gas. The term "nano-emitter" means a field electron emitter having at least two dimensions that are on the nanoscale, being between 0.1 and 100 nm. Each nano-emitter may be in the form of a nanotip which projects cantilever-fashion from a substrate. In one embodiment, the field emitter array comprises bundles of silicon nanotips grown on the substrate.

The field emitter array may form part of a field emitter array device that also includes an embedded extraction grid. A control arrangement may be configured to apply a voltage pulse across the extraction grid and the annular anode, thus causing emission of electrons from the field emitter array, and, at the same time, providing the electric field for propelling the emitted electrons along respective electron trajectories through the ionizable gas.

In some embodiments, the nano-emitters are provided on a substrate which is oriented transversely to (e.g., being perpendicular to) a longitudinal axis of the neutron generator, with the respective nano-emitters being axially oriented to effect electron emission in the axial direction. In a particular embodiment, the substrate is circular and is co-axial with the annular anode, resulting in electron emission and acceleration which are symmetrical about the longitudinal axis.

Figure 1:
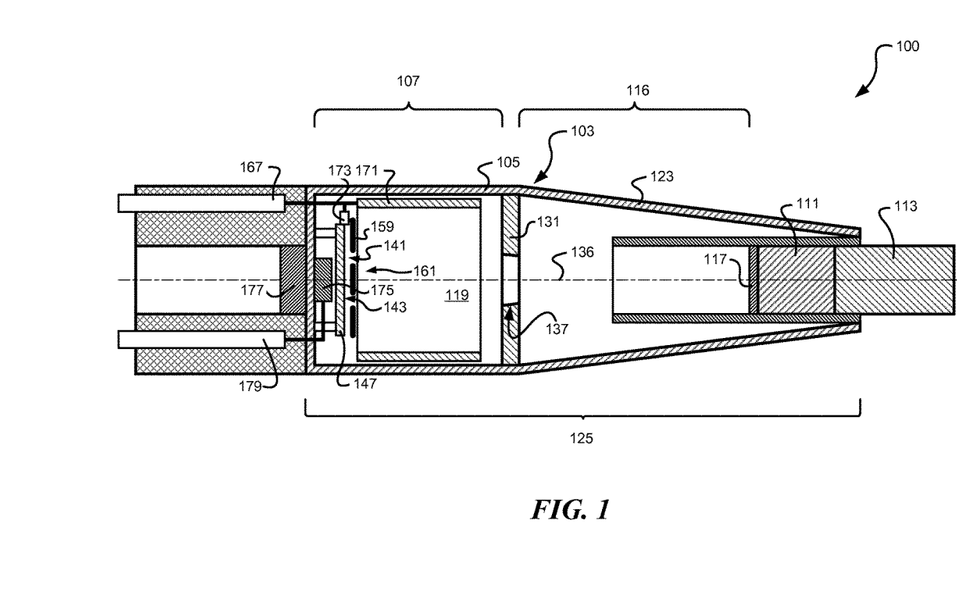
FIG. 1 is a schematic sectional side view of a neutron generator according to one example embodiment.

FIG. 1 shows a schematic diagram of a neutron generator 100 in accordance with an example embodiment. The neutron generator 100 is configured for incorporation in a logging tool 505 such as that described with reference to FIG. 5. The neutron generator 100 has an elongate housing 103 dimensioned for fitting longitudinally in a borehole 516 (see, e.g., FIG. 5) with radial clearance. In this example embodiment, the housing comprises a hollow cylindrical tube 105 dimensioned for longitudinal insertion in and movement along a borehole 516 of standard size, in this example embodiment having an outer diameter of about 1.69 inches. The tube 105 is of an electrically non-conductive, insulating material, for example being made of alumina ceramic.

Figure 4:
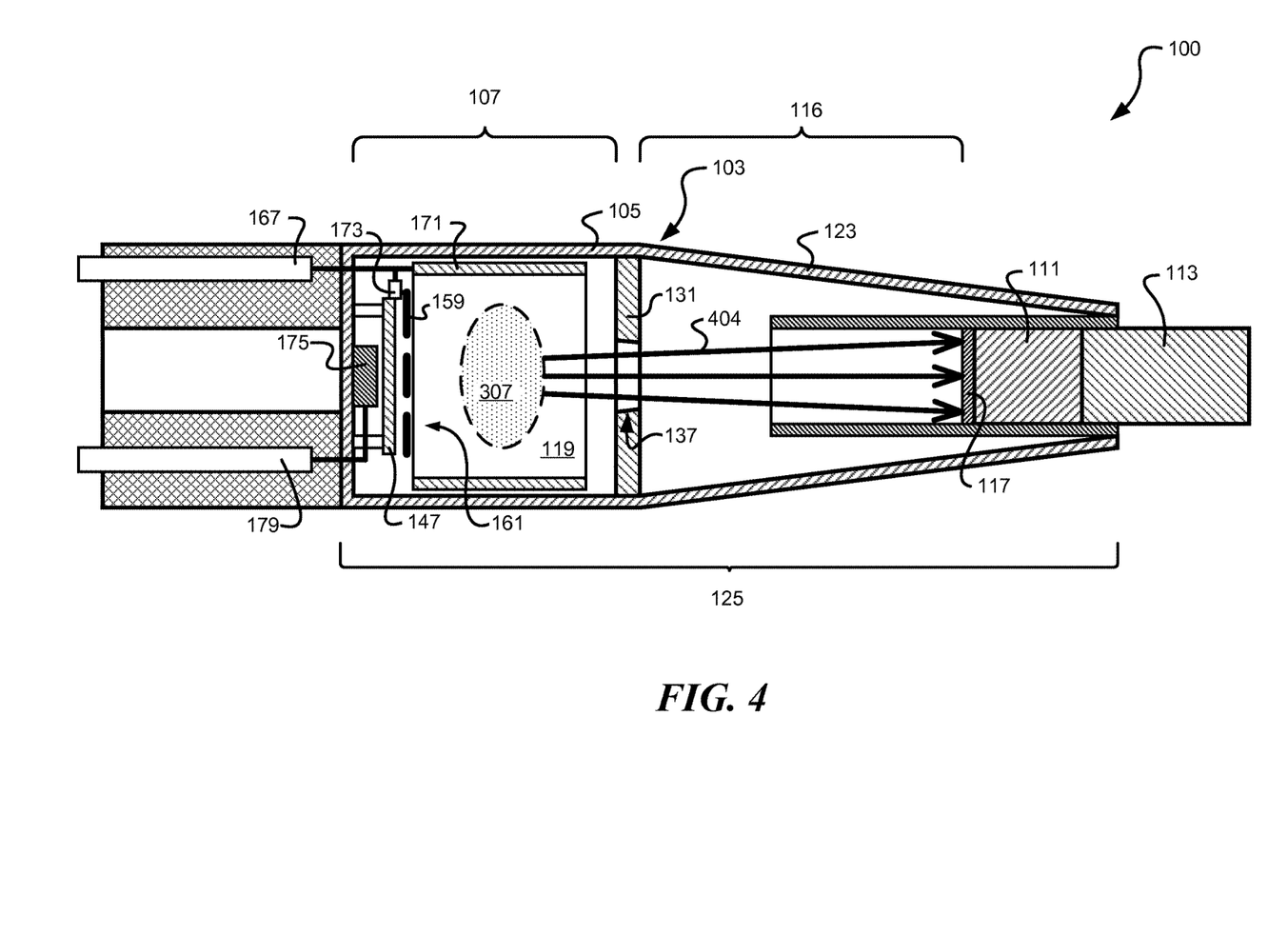
FIG. 4 is a view corresponding to FIG. 1, showing a deuterium-tritium plasma formed in an ion chamber of the example neutron generator, and further showing an ion beam comprising ions extracted from the ion chamber and accelerated into collision with a doped target, to cause neutron emission due to a fusion reaction.

The neutron generator 100 includes an ion source 107 for producing positively charged ions that can be extracted from the ion source 107 to form an ion beam (see, for example, FIG. 4, in which the ion beam is indicated by reference numeral 404) directed at a target rod 111 co-axial with the housing 103. A cylindrical target electrode 113 is positioned co-axially with the target rod 111 at an end of the target rod 111 furthest from the ion source 107. The target electrode 113 serves to provide an electric field for accelerating positively charged ions from the ion source 107 towards and into collision with the target rod 111. The target rod 111 includes a circular target layer 117 deposited on an axial end face of the target rod 111 directed towards the ion source 107. The target layer 117 is a metal layer doped or saturated with deuterium and/or tritium atoms, in this example being a titanium layer. When ions of the ion beam 404 collide with deuterium and/or tritium atoms in the target layer 117, energetic neutrons (N) are created by the well-established D+T+=He+n+14.6 MeV reaction. The neutrons escape in random, symmetrical directions from the target layer 117 towards the surrounding environment, which may be a subsurface formation (see for example FIG. 5). When the neutron generator 100 forms part of a subterranean logging tool 505, the neutrons are thus ejected into a surrounding formation to enable evaluation of physical characteristics of the subsurface formation.

An ion chamber 119 of the ion source 107 is provided by a circular cylindrical section of the housing 103, with a frustoconical high-voltage insulator 123 extending between the ion chamber 119 and the target rod 111. The housing 105 thus provides a vacuum envelope 125 which is hermetically sealed and maintained at very low pressure conditions, or vacuum conditions. The substantially cylindrical ion chamber 119 is co-axial with a longitudinal axis 136 of the neutron generator 100. In operation, the neutron generator 100 and the tool 505, of which it forms part is inserted in the borehole 516 such that the longitudinal axis 136 extends lengthwise along the borehole 516. The ion source 107 is, in this example embodiment, configured to produce a mixture of positively charged deuterium ions (D+) and tritium ions (T+). The ion chamber 119 has a bulkhead 131 at an end thereof proximate to the target rod 111. The bulkhead 131 defines a central, circular extraction aperture 137 to allow axial passage of accelerated ions from the ion chamber 119 on to the target layer 117 (see FIG. 4).

The ion source 107 is configured to produce positively charged ions by electron impact ionization resulting from energetic movement of electrons through an ionizable gas contained in the ion chamber 119, in this example comprising gas phase deuterium and tritium. For brevity of description, gas phase deuterium and tritium atoms in the ion chamber 119 are further referred to as the D/T gas. Electron discharge for use in the electron impact ionization process is provided in the ion source 107 by a field emitter (FE) device 161 that includes a field emitter array. The field emitter array 141 is thus configured to serve as an electron source for fast-moving electrons used in electron impact ionization in the ion chamber 119. As will be described in greater detail below, the field emitter array 141 comprises an array of nano-emitters, in this example consisting of bundles of silicon nanotips 202 (see FIG. 2) on a circular base disc 147 located co-axially in the ion chamber 119. The base disc 147 provides an axially facing circular substrate surface 143 for the nanotip array 141. The nanotip field emitter array 141 thus serves as an electron source cathode for the ion source 107. The ion source 107 further includes an annular anode 171 (also referred to as a ring anode) co-axial with the array 141 and located axially adjacent to the array 141, so that the nanotip field emitter array 141 is directed towards a central circular opening of the annular anode 171.

Field emission (FE) (also known as field electron emission and electron field emission) is emission of electrons induced by an electrostatic field. A field emitter array (FEA) is a particular form of an area field electron source. The structure of a field emitter array typically consists of a very large number of individual, similar, small field electron emitters, usually organized in a regular two-dimensional pattern. In the neutron generator 100, the individual small field electron emitters are provided by the nanotips 202 of the field emitter array 141. Field emission occurs when an electron tunnels through a potential barrier between a conductor or semiconductor matrix material and a low-pressure volume. The electron emission process is facilitated by the provision of the small field electron emitters such as the nanotips 202 of the present example embodiment.

Figure 2:
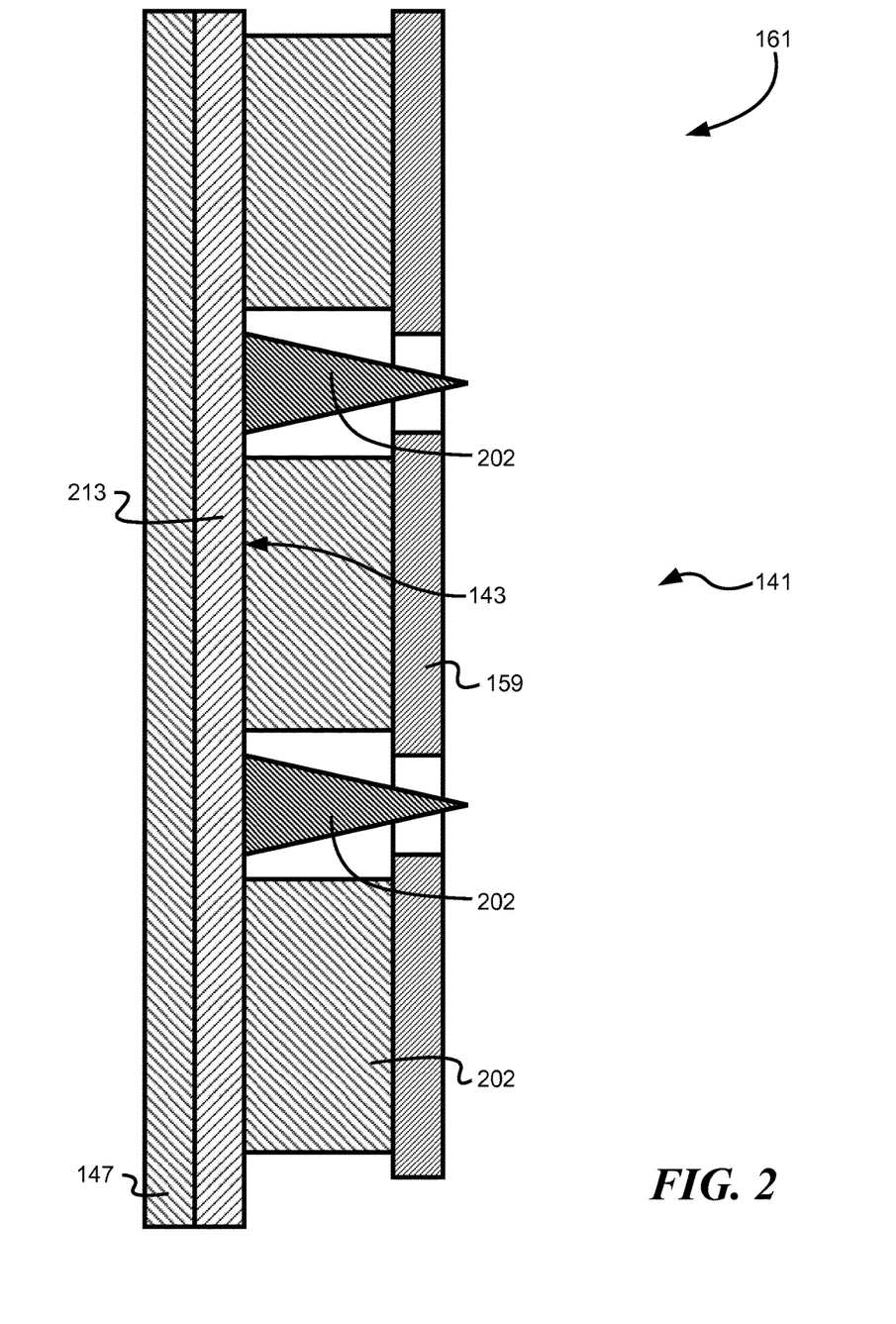
FIG. 2 is a simplified sectional side view, on an enlarged scale, of a nano-emitter that forms part of a field emitter array of the example neutron generator of FIG. 1, according to a particular example embodiment.

FIG. 2 shows a simplified side view of a part of the field emitter array device 161 of the example embodiment, including the field emitter array 141. The base disc 147 in this example embodiment provides a semiconductor substrate 213 for the field emitter array 141. In this example embodiment, the base disc 147 is constructed of metal, with a silicon layer on its axial end face providing the substrate 213. The field emitter nanotip array 141 comprises a multitude of nanotips 202, this example embodiment comprising silicon formations grown on the substrate 213.

Each nanotip 202 projects cantilever-fashion away from the base disc 147 and thus extends substantially parallel to the longitudinal axis of the ion chamber 119, normal to the axially outer surface of the circular substrate 213. Each nanotip 202 is roughly conical in shape, tapering to a tip end furthest from the base disc 147. The length of each nanotip is less than 10 nm, in this example embodiment being about 2 nm. In this example embodiment, the density of the nanotips 202 on the base disc 147 is between $10^4$ and $10^6$ nanotips per square centimeter.

The circular substrate 213 on the base disc 147 has a diameter sufficiently small to fit inside the ion chamber 119 of the neutron generator 100, bearing in mind that the neutron generator 100 is sized and shaped for incorporation in a borehole logging tool 505. In this example embodiment, the base disc 147 has a diameter of less than 1.2 inches. In this embodiment, the nanotips 202 of the field emitter array 141 are silicon nanotips grown on the base disc 147. Note that the nanotips 202 and the substrate 213 provided by the base disc 147 may, in other embodiments, be of different materials. In one embodiment, for example, the nanotips 202 may be made of molybdenum (Mo). Alternatively, the nanotips 202 may be of carbon. In yet a further example embodiment, each nanotip 202 may comprise, for example, a molybdenum base tip attached to the substrate 213 and a carbon or silicon nanotip molecularly formed on the end of the molybdenum base tip, using techniques known in the art.

Referring again to FIG. 1, is shown that the FE device 161 further includes an embedded extraction grid 159 to control current to the nanotips 202 of the field emitter array 141. In the FIG. 1, the extraction grid 159 is shown, for clarity of illustration, as being separate from the FE array 141, but the extraction grid 159 is, in this example embodiment, embedded in the FE device 161. Turning again to FIG. 2, it can be seen that the extraction grid 159 of the example embodiment is provided by a conducting gate layer parallel to the substrate 213 and spaced from the substrate 213 by an insulating layer 202. The conducting gate layer that provides the extraction grid 159 defines openings therein corresponding to the positions of the respective nanotips 202. The FE device 161 therefore provides a field emitter often referred to as a "Spindt-type" FEA. By applying appropriate voltage to the extraction grid 159, the current to the field emitter nanotips 202 is controlled, thus controlling electron emission by the FE array 141. Control circuitry for the neutron generator 100 includes an anode-cathode connector 167 to selectively control connection of the annular anode 171 and the FE array extraction grid 159, thereby to control voltage differences across the anode 171 and the extraction grid 159. The anode-cathode connector 167 is connected to the anode 171 and the FE extraction grid 159 through a bias resistor 173.

The ion source 107 further comprises a gas source in the sample form of a gas reservoir element 175 (FIG. 1) to allow selective control of D/T gas release into the ion chamber 119, and to control gas pressure in the ion chamber 119. The construction and operation of the gas reservoir element 175 may be in accordance with known methods for controlling ionizable gas release and pressure in neutron generator tubes. In this example embodiment, the gas reservoir element 175 comprises a tungsten filament coated with a film of zirconium or the like. Adsorption and desorption of ionization gas molecules (in this example embodiment consisting of deuterium and tritium atoms) can be controlled by controlling the temperature of the gas reservoir element 175, and thereby controlling ionization gas conditions in the ion chamber 119. A control arrangement of the neutron generator 100 accordingly includes a gas reservoir control connector 179 for controlling ionization gas conditions in the ion chamber 119 by controlling energization of the gas reservoir element 175.

The neutron generator 100 further includes a removable permanent magnet 177 mounted adjacent the ion source chamber 119, in a header section of the housing 105. The magnet 177 is configured to provide a magnetic field in the ion source chamber 119 that is in at least some parts of the ion source chamber 119 misaligned with an electric field in operation provided by the electrode arrangement comprising the FE device 161, as cathode, and the annular anode 171. In this context, misalignment between the electric field and the magnetic field means that, for at least some of the emitted electrons, an electric force caused by the electric field and a magnetic force caused by the magnetic field are misaligned, and act in different directions.

As can be seen with reference to FIG. 1, the electric field between the annular anode 171 and the FE device 161 has non-negligible radial components for significant portions of the ion chamber, with a radial component of an electric force on respective electrons progressively increasing as the annular anode is radially approached. The magnetic field provided by the permanent magnet 177, however, is configured and oriented to act predominantly axially, urging electrons emitted from the FE device 161 along the longitudinal axis 136. In some portions of the ion chamber 119, the magnetic field thus acts transversely to the electric field. The magnet 177 comprises a disc-shaped magnetized ferromagnetic element mounted on the housing 105 at the same longitudinal and as the FE device 161. The magnet 177 is removably and replaceably connected to the housing 105, so that the magnet 177 can readily be replaced when it's magnetic properties degrade over time.

As will be evident from the above description, the disclosure provides a pulsed neutron generator 100 based on the deuterium-tritium (D-T) fusion reaction having a nanoemitter array 141 as the ion source cathode. During operation, voltage is applied to the gas reservoir control connector 179, to supply sufficient current needed to the gas reservoir element 175 for providing the D/T gas working pressure in the ion chamber 119.

Thereafter, a voltage pulse of appropriate amplitude is applied to the anode-cathode connector 167. This voltage pulse causes extraction of a burst of electrons from the field emitter array 141 through the electron extraction mechanisms by the above. The extracted electrons are accelerated toward the annular ion source anode 171, being attracted to the positively charged anode 171. In this example embodiment, the direct current (DC) voltage pulse applied to the anode-cathode connector 167 has a maximum amplitude of 500 V.

During movement from the FE array 141 of the extracted electrons along the ionization trajectory 303, the rapidly moving electrons collide with the atoms of the D/T gas, thereby ionizing the D/T gas and creating D+ and T+ ions. In contrast to the extracted electrons, the positively charged D+ and T+ ions are repelled by the ring anode 171, thus being urged radially inwards towards a central region of the ion chamber 119, axially aligned with the extraction aperture 137. The positively charged ions collect in the center of the ion chamber 119 to form a plasma (generally indicated by reference numeral 307 in FIGS. 3 and 4) co-axially aligned with the extraction aperture 137 and the target rod 111.

Figure 3:
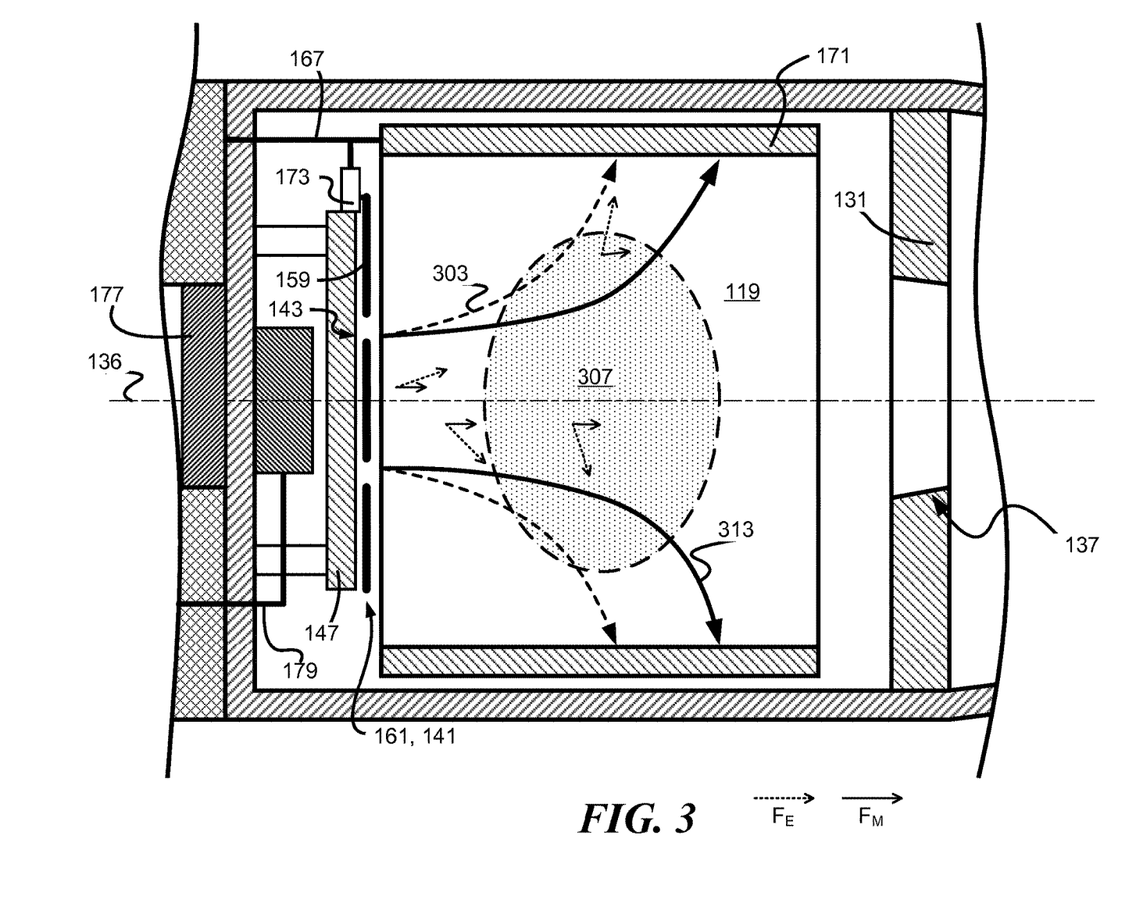
FIG. 3 is a schematic sectional side view, on an enlarged scale, of an ion source that forms part of the neutron generator of FIG. 1 according to an example embodiment, showing an electron current trajectory in use followed by electrons extracted from an electron emitter array of the neutron generator.

Because the nanotips 202 on the axially facing substrate extending axially (see FIG. 2) the electrons emitted by the FE device 161 have an initial velocity vectors that are substantially axial, having substantially no radial component. Because the ring anode 171, however, is co-axial with the FE array 141 but located at a radius greater than that of the FE array 141, the extracted electrons are propelled by the resultant electric field towards the ring anode 171 in respective directions having both axial and radial components. Absent the effects of the magnetic field provided by the permanent magnet 177 the electrons would be rapidly accelerated radially outwards towards the ring anode 171. In FIG. 3, reference numeral 303 generally indicates default trajectories (shown in broken lines) that would be followed by emitted electrons under the influence of only the electric field generated by the pulsed voltage difference between the FE device 161 and the ring anode 171. Reference numeral 313, however, indicate modified trajectories (shown in unbroken lines) followed by similarly originating electrons which are routed through the ionization chamber 119 under the influence of both the electrical field and of the magnetic field provided by the permanent magnet 177.

As can be seen, the default trajectory 303 of the considered electrons follow a more steeply radial curve than is the case for the modified trajectories 313. This is because predominantly axial magnetic forces exerted on the electrons by the permanent magnet cause axial movement of electrons further along the ion chamber 119 before reaching the radially outer periphery of the ion chamber 119 provided by the ring anode 171. Differently defined, a net resultant force on the respective electrons have a proportionately smaller radial component when the electrons are accelerated caused by the permanent magnet 177 and by the electric field. In FIG. 3 the orientation and relative size of the magnetic field caused by the permanent magnet 177 and the electric field caused by the electrode arrangement are schematically indicated for a selection of positions in the ion source chamber 119 by magnetic force vectors ($F_M$) and electric force vectors ($F_E$). It will be seen that the magnetic field vectors $F_M$ act predominantly in a direction parallel to the central axis 136 of the ion chamber 119, while the electric field vectors $F_E$ predominantly have radial components which are not insignificant. In some parts of the ion chamber 119, the magnetic field and the electric field act substantially transversely to each other.

Due to the influence of the magnetic field provided by the permanent magnet 177, the modified trajectories 313 of electrons through the ion source chamber 119 is longer than it would otherwise have been (e.g., following default trajectories 303). Because electrons traveling along the modified trajectories 313 travel a greater distance through the D/T gas in the ion source chamber 119, the probability of electron impact ionization is increased by provision of the permanent magnet 177. For cases where the radial dimensions of the ion source dictate the use of a field emission array with insufficient surface area for proving an effective ionization current, the presence of a magnetic field of approximately 1,000 G can increase the ionization probability by a factor of 5.1.

The D/T ions of the plasma 307 are extracted through the extraction aperture 137 and are accelerated in the acceleration gap 116 due to the electric field provided by the target electrode 113, before impacting the target layer 117 on the target rod 111. The D+ and T+ ions thus extracted form a high energy ion beam, generally indicated by reference numeral 404 in FIG. 4. Impact of the ion beam 404 with the target layer 117 initiates nuclear fusion upon colliding with DT atoms absorbed in the target layer 117. As described earlier, this fusion reaction results in radiation of high-energy neutrons from the neutron generator 100.

It is a benefit of the neutron generator 100 as described in the example embodiment above, that the FE device 161 is capable of supplying an ionization current (e.g., a flow of electrons extracted by the extraction grid 159) that is large enough to enable sub-microsecond ignition of the ion source 107. Many conventional ion sources uses substantially larger anode voltages for ion source ignition. Anode voltages of several thousand volts in such conventional ion sources often produce ion source current densities of a few mA/cm$^2$. By comparison, the example ion source 107 described above provides a sufficient electron current (e.g., 1 A/cm$^2$) with anode voltage that is orders of magnitude smaller (e.g., the 500V anode voltage described in the above example embodiment). The lower anode voltage of the disclosed neutron generator 100 beneficially reduce electrical stress and complications associated with very high voltages, thus improving robustness and reliability of the neutron generator 100 overall.

Provision of the permanent magnet 177 increases the ionization probability for a given electron current, thereby reducing ignition times for the neutron generator 100. Further, increased ignition probability allows the neutron generator 100 to work at lower gas pressures in the ion source chamber 119. A reduction in working pressure, in turn, reduces probability of internal arcing, which increases reliability of the neutron generator 100. Note that, unlike conventional Penning-type neutron generators, the presence of the permanent magnet 177 is not a prerequisite for functionality of the ion-generating mechanism of the common generator 100. Instead, the magnet 177 serves to improve ionization efficiency by increasing the ionization probability due to extended electron travel through the D/T gas.

Figure 5:
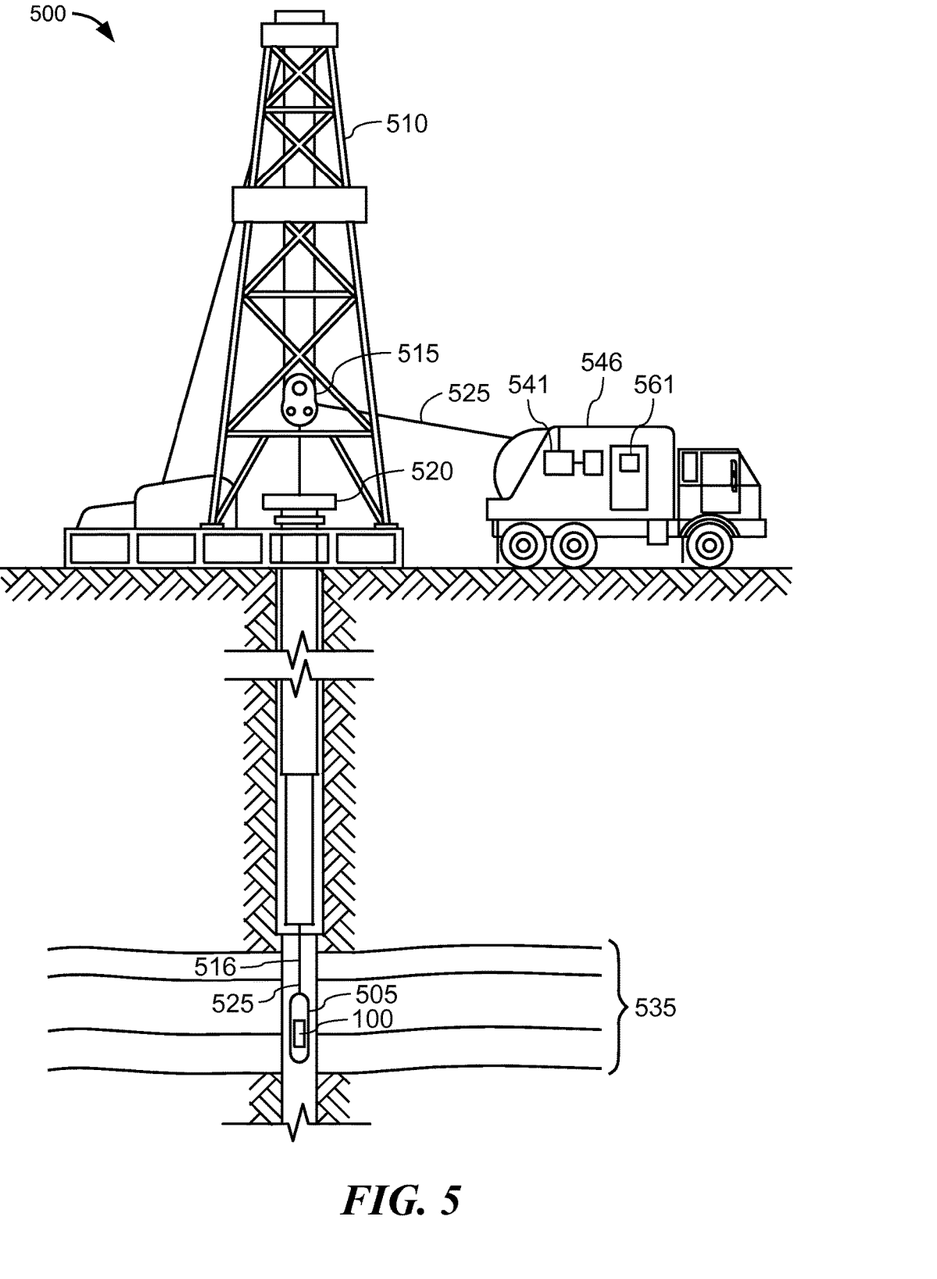
FIG. 5 shows a diagrammatic view of a wireline logging system that includes a neutron generator, according to an example embodiment.

FIG. 5 illustrates an example of a wireline logging system 500 that may incorporate a neutron generator 100 such as that described above with reference to the example embodiments of FIGS. 1-4. The neutron generator 100 may be incorporated in a tool 505 that is configured for subsurface deployment by insertion and movement along a borehole 516.

The system 500 includes a derrick 510 that supports a pulley 515. Drilling of oil and gas wells is commonly carried out by a string of drill pipes connected together so as to form a drilling string that is loaded through a rotary table 520 into a wellbore or borehole 516. FIG. 5 shows the borehole 516 with the drilling string temporarily removed to allow the wireline logging tool 505, for example being in the form of a probe or a sonde, to be lowered by wireline or logging cable 525 into the borehole 516.

The wireline logging cable 525 may have one or more electrical and/or optical conductors for communicating power and signals between the surface and the logging tool 505. Typically, the tool 505 is lowered to the bottom of the region of interest and subsequently pulled upward. During the upward trip, sensors located in the tool 505 may be used to perform measurements on subsurface formations 535 adjacent a borehole 516 as they pass by.

Measurements may comprise downhole pressure, downhole temperature, resistivity or conductivity of drilling mud and the Earth formations 535, the density and porosity of the Earth formations 535, as well as the orientation of the borehole 516. Sensor examples include, but are not limited to: a resistivity sensor, a porosity sensor, a nuclear density sensor, a magnetic resonance sensor, and a directional sensor package. In addition, formation fluid samples and/or core samples may be extracted from the formation 535 using a formation tester. Such sensors and tools are known to those skilled in the art. While described herein as a wireline logging operation, it will be understood by those skilled in the art that similar measurements may be made during drilling, completion, and production operations. Such sensors may be deployed using coiled tubing, drill pipe, and pre-wired drill pipe. In this example embodiment, the tool 505 has incorporated therein a neutron generator 100 such as that described above with reference to FIGS. 1-4. The tool 505 may, in some embodiments, be deployed downhole to determine formation parameters comprising density and porosity.

The measurement data can be communicated to a surface processor 541 in a logging facility 546 for storage, processing, and analysis. The logging facility 546 may be provided with electronic equipment for various types of signal processing. Similar log data may be gathered and analyzed during drilling operations (e.g., during logging while drilling, or LWD operations). The log data may also be displayed at the rig site for use in the drilling and/or completion operation on a display device 561.

Although systems, apparatuses, and methods according to the disclosure a have been described with reference to specific example embodiments, it will be evident that various modifications and changes may be made to these embodiments without departing from the broader scope of methods, apparatuses, and/or systems. Accordingly, the specification and drawings are to be regarded in an illustrative rather than a restrictive sense.

In the foregoing Detailed Description, it can be seen that various features are grouped together in a single embodiment for the purpose of streamlining the disclosure. This method of disclosure is not to be interpreted as reflecting an intention that the claimed embodiments in all instances have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A neutron generator comprising:
a housing defining an ion source chamber;
an electron nano-emitter arrangement comprising multiple field electron emitters located in the ion source chamber;
an electrode arrangement comprising an anode separated from the electron nano-emitter arrangement by a separation space, wherein the separation space holds an ionizable gas; and
a permanent magnet that provides a magnetic field in misalignment with an electric field generated by the electrode arrangement.

2. The neutron generator of claim 1, wherein the housing has a longitudinal axis, the electron nano-emitter arrangement being oriented to emit electrons along a path parallel to the longitudinal axis, wherein the anode is not in the path parallel to the longitudinal axis.

3. The neutron generator of claim 2, wherein the electron nano-emitter arrangement comprises a substrate providing a substantially circular substrate on which the field electron emitters are supported, the substrate being co-axial with the longitudinal axis of the housing and extending transversely thereto.

4. The neutron generator of claim 2, wherein the magnetic field is aligned perpendicular to the longitudinal axis.

5. The neutron generator of claim 2, wherein the permanent magnet is coaxial with the longitudinal axis of the ion source chamber.

6. The neutron generator of claim 1, wherein the permanent magnet and the multiple field electron emitters are located at a common longitudinal end of the housing.

7. The neutron generator of claim 2, wherein the anode is substantially annular and co-axial with the longitudinal axis of the ion source chamber, the anode being axially spaced from the multiple field electron emitters.

8. The neutron generator of claim 3, wherein an inner radius of the anode is greater than a radially outer extremity of the substantially circular substrate of the multiple field electron emitters.

9. The neutron generator of claim 1, further comprising a control arrangement to apply an ion source voltage pulse between the electron nano-emitter arrangement and the anode to generate the electric field, the electron nano-emitter arrangement serving at least in part as an ion source cathode.

10. The neutron generator of claim 9, wherein the ion source voltage pulse has an amplitude of 500 V or less.

11. The neutron generator of claim 9, wherein a turn-on/turn-off delay for an ion source comprising the electron nano-emitter arrangement and the anode is smaller than 1 µs.

12. The neutron generator of claim 1, wherein the field electron emitters comprise multiple nanotips, each nanotip comprising an elongated filament which is substantially aligned with a longitudinal axis of the housing.

13. The neutron generator of claim 1, further comprising: a target structure holding target particles, wherein the target particles comprise isotopes.

14. The neutron generator of claim 13, wherein the target particles comprise at least one of deuterium or tritium.

15. A neutron generator comprising:
a housing defining an ion source chamber;
an electron nano-emitter arrangement comprising multiple field electron emitters located in the ion source chamber;
an electrode arrangement comprising an anode separated from the electron nano-emitter arrangement by a separation space by a separation space, wherein the separation space holds an ionizable gas, and wherein the anode is substantially annular and co-axial with a longitudinal axis of the ion source chamber; and
a permanent magnet that provides a magnetic field in misalignment with an electric field generated by the electrode arrangement.

16. The neutron generator of claim 15, wherein the permanent magnet is arranged with respect to the electrode arrangement to provide the magnetic field substantially perpendicular to the electric field in at least one part of the ion source chamber.

17. The neutron generator of claim 15, wherein the permanent magnet is arranged to provide the magnetic field aligned perpendicular to the longitudinal axis of the ion source chamber.

18. The neutron generator of claim 15, further comprising a target structure positioned longitudinally opposed to the electron nano-emitter arrangement, wherein the target structure comprises one or more isotopes, and wherein the separation space is between the target structure and the electron nano-emitter arrangement.

19. The neutron generator of claim 18, wherein the isotopes comprise at least one of tritium and deuterium.

20. A neutron generator comprising:
a housing defining an ion source chamber;
an electron nano-emitter arrangement comprising multiple field electron emitters located in the ion source chamber;
an electrode arrangement comprising an anode separated from the electron nano-emitter arrangement by a separation space, wherein the separation space holds an ionizable gas; and
a permanent magnet that provides a magnetic field in misalignment with an electric field generated by the electrode arrangement, wherein the permanent magnet and the multiple field electron emitters are located at a common longitudinal end of the housing.

* * * * *